United States Patent [19]
Giles

[11] 3,995,180
[45] Nov. 30, 1976

[54] GENERATOR ROTOR OUTLETS FOR INCREASED VENTILATION

[75] Inventor: Walter B. Giles, Scotia, N.Y.

[73] Assignee: General Electric Company, Schenectady, N.Y.

[22] Filed: Mar. 10, 1975

[21] Appl. No.: 556,802

[52] U.S. Cl. .................................... 310/55; 310/61
[51] Int. Cl.² ........................................ H02K 9/00
[58] Field of Search ................... 310/52, 53, 54, 55, 310/56, 58, 59, 60, 60 A, 64, 65, 194, 214, 215, 216, 217, 218

[56] References Cited
UNITED STATES PATENTS

| | | | |
|---|---|---|---|
| 2,702,870 | 2/1955 | Norris | 310/64 |
| 2,791,707 | 5/1957 | Willyoung | 310/64 |
| 2,986,664 | 5/1961 | Willyoung | 310/61 |
| 3,265,912 | 8/1966 | Baudry | 310/55 |
| 3,271,600 | 9/1966 | Philofsky | 310/55 |
| 3,348,081 | 10/1967 | Willyoung | 310/55 |
| 3,809,934 | 5/1974 | Baer | 310/53 |

Primary Examiner—R. Skudy
Attorney, Agent, or Firm—Leo I. MaLossi; Joseph T. Cohen; Jerome C. Squillaro

[57] ABSTRACT

In a gas-cooled generator or other dynamoelectric machine, the windings mounted in slots in the rotor are provided with a plurality of passages for the flow of cooling gas from the gap between the rotor and stator, diagonally down through the windings, then diagonally back up to the gap. In contrast to the prior art, wherein two ascending passages join at a shared outlet duct to the gap, the separation is maintained herein, by providing a completely separate outlet duct for each ascending passage, for improving the flow of cooling gas through the rotor and into the gap.

6 Claims, 5 Drawing Figures

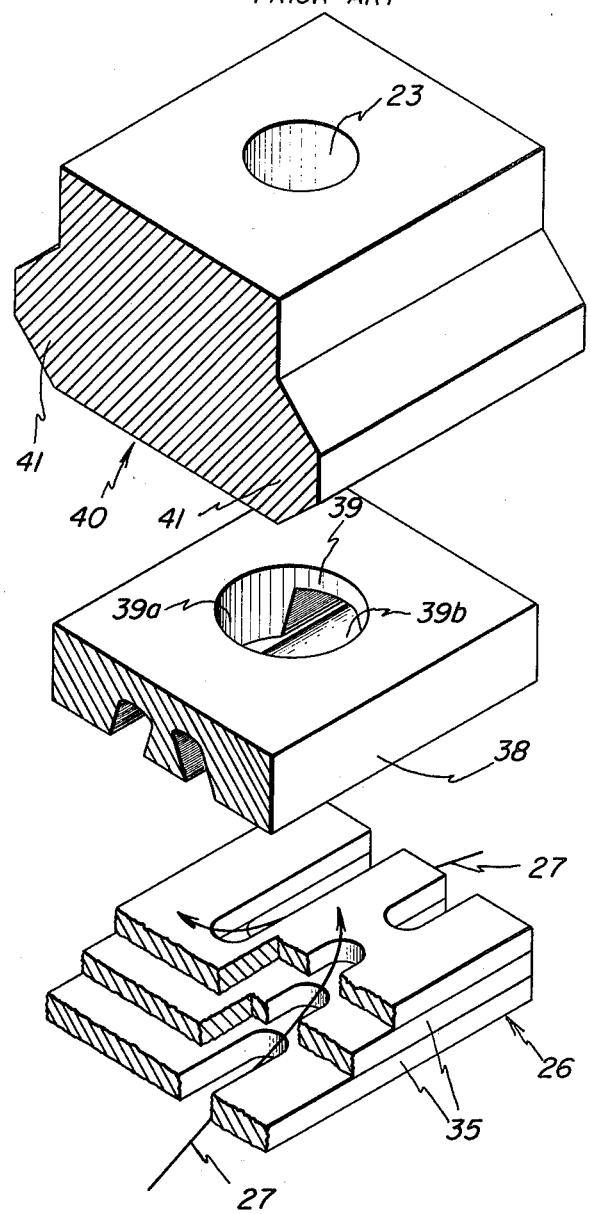
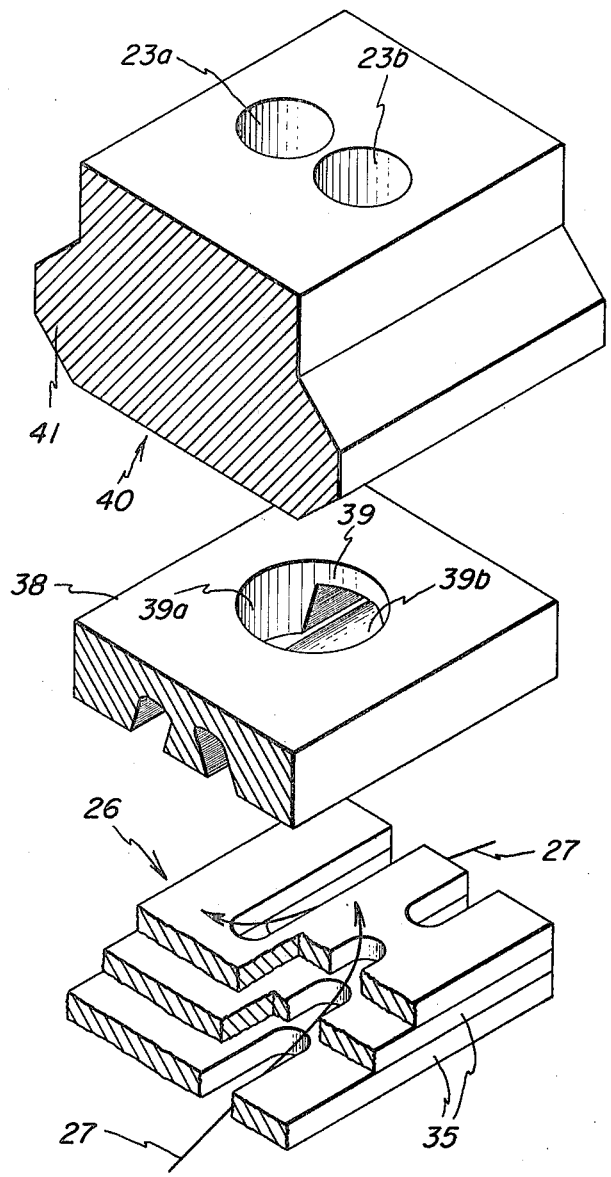

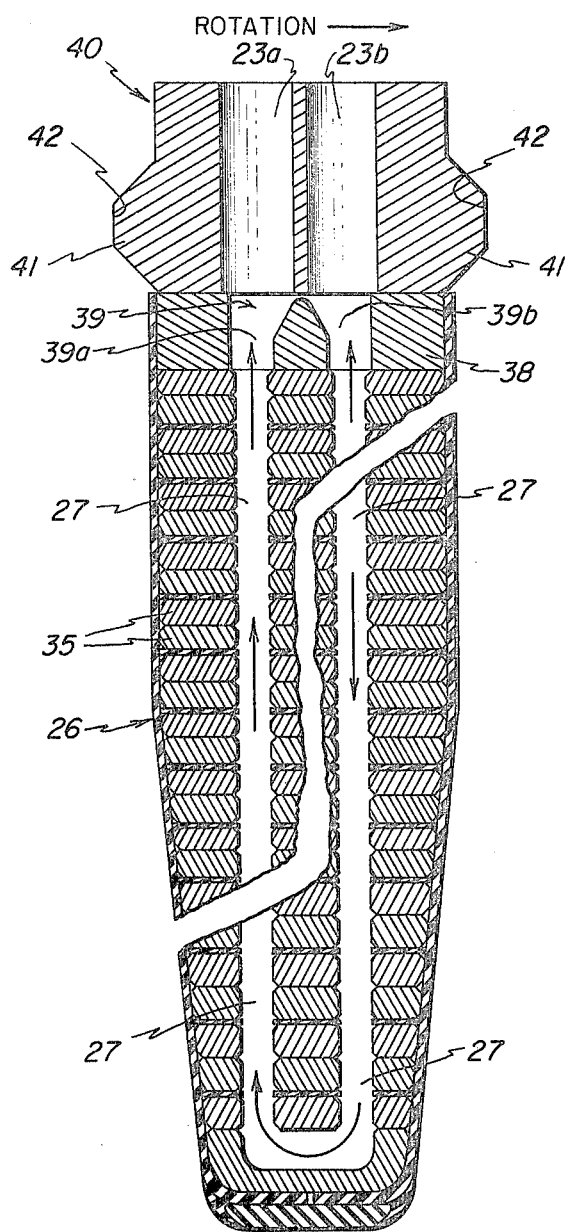

3,995,180

GENERATOR ROTOR OUTLETS FOR INCREASED VENTILATION

BACKGROUND OF THE INVENTION

This invention relates to gas-cooled dynamoelectric machines, and more particularly to a generator with modifications to the region where the ascending diagonal cooling gas flow passages emerge into the gap between the rotor and the stator.

Large turbine-generators and other similar dynamoelectric machines are limited in capacity by the ability of the cooling system to remove heat from the rotor. As shown in U.S. Pat. No. 3,348,081 to D. M. willyoung, the cooling system can be provided by radial ducts in the stator, a gap pickup rotor to scoop hydrogen gas coolant from the gap for cirulation through internal passages in the rotor, and fans and heat exchangers to produce a coolant flow to ventilate the machine. There are large clearances of approximately three to four inches between the stator and rotor, hence an attempt to use fan or blower pressurization to drive the cooling hydrogen flow through the rotor tends to be thwarted by excessive leakage in this clearance. Partial radial baffles may also be used to restrict axial leakage from an outlet rotor zone to an inlet rotor zone.

In my commonly assigned, co-pending application, Ser. No. 470,061 (now U.S. Pat. No. 3,906,265), filed May 14, 1974, I have shown a similar machine wherein one or more honeycomb stator inserts comprising a large cell honeycomb baffle structure defining radial passages for coolant flow are mounted on the stator extending into the gap between the stator and rotor of a gas-cooled dynamoelectric machine such as a generator of the foregoing type. Preferably, a plurality of honeycomb insert sectors are mounted adjacent to one another in the gap so as to be substantially peripherally continuous. The honeycomb baffling functions dually as axial baffles to restrict axial leakage of the coolant especially between cooling zones, and as peripheral baffles to effect a material reduction of the swirl flow in the gap. Since the relative velocity of the gas with respect to the rotor inlet and outlet ducts is increased, higher pumping pressures of coolant through the rotating rotor are realized for improved rotor cooling. Reduced axial leakage and nearly complete circumferential closure of the gap results in improved zone pressurization and utilization of the fans or blowers circulating the coolant. In that application, I have also disclosed in FIG. 6 a variation of the rotor, wherein the windings are provided with radial, rather than diagonal passages, connecting to axial ducts within the rotor for circulation of coolant from an inlet to an outlet duct. However, the use of diagonal passages is accepted in the art as an excellent design, and the present invention was developed to improve the cooling of machines provided therewith.

SUMMARY OF THE INVENTION

In a gas-cooled generator or other dynamoelectric machine, the windings mounted in slots in the rotor may be provided with a plurality of passages for the flow of cooling gas from the gap between the rotor and stator, diagonally down through the windings, then diagonally back up to the gap. In contrast to such prior art, wherein two previously separate ascending passages join at a shared outlet duct to the gap, the separation is maintained herein, by providing a completed separate outlet duct for each ascending passage, thereby improving the flow of cooling gas through the rotor and into the gap.

The principles of the invention will be further hereinafter discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

FIG. 3 is an exploded fragmentary perspective view of the juncture of two outlet passages at an outlet duct in accordance with the PRIOR ART;

FIG. 4 is an exploded fragmentary perspective view of the same part of a generator as is shown in FIG. 3, but depicting the maintained separation of the two outlet passages at a pair of twinned outlet ducts provided in accordance with the present invention; and FIG. 5 is a fragmentary transverse crosssectional view of one radial slot of the stator, and further depicting the maintained separation shown in FIG. 4.

DESCRIPTION OF THE PREFERRED EMBODIMENT

Figure 1:
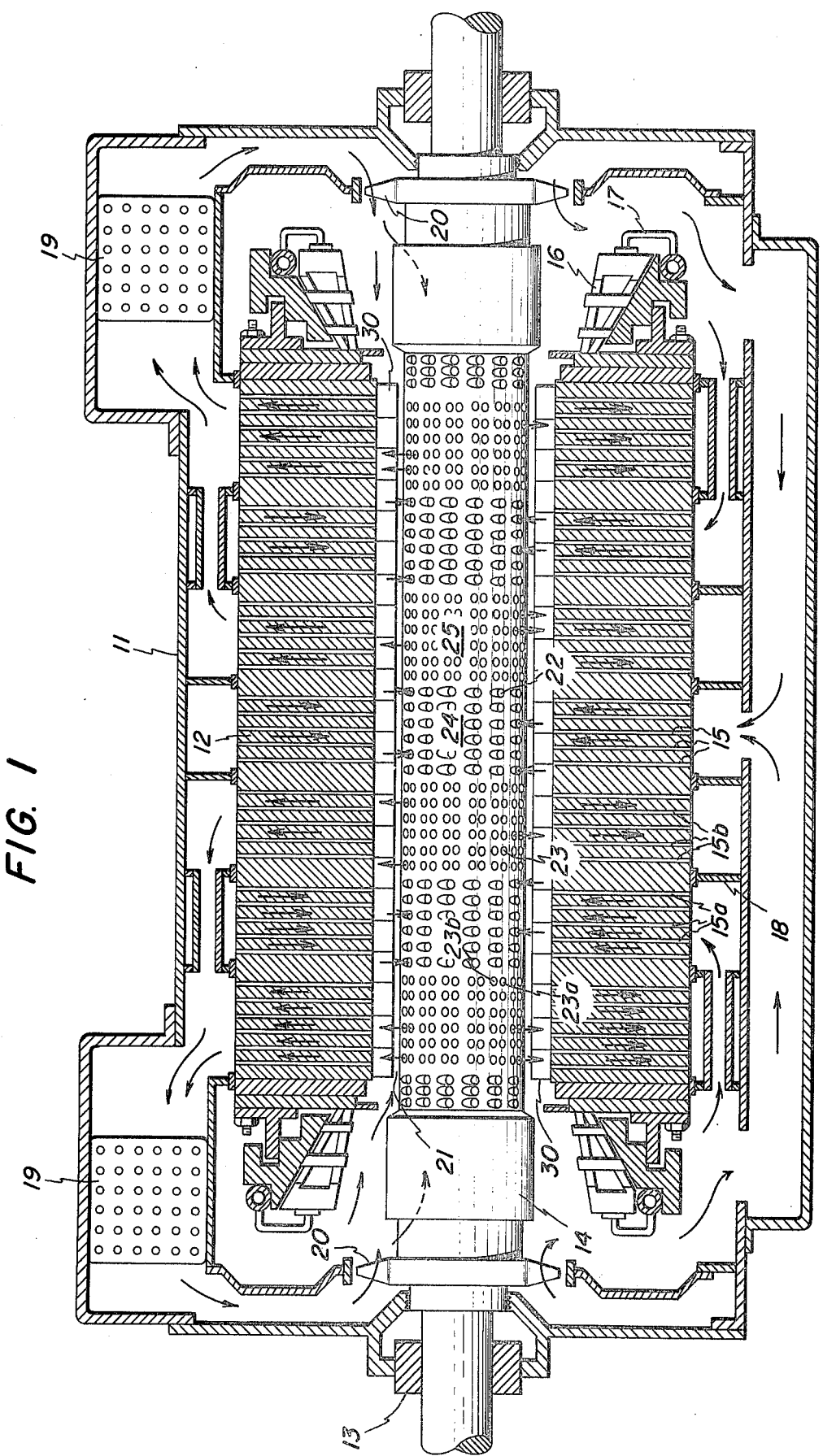
FIG. 1 is a composite plan and elevational view, partly in section, of a large, hydrogen-cooled generator constructed for improved cooling as herein taught.

In the schematic drawing of a large gas-cooled electrical generator shown in FIG. 1, the lower half of the drawing is rotated 90° with respect to the upper half to illustrate more clearly the components of the cooling system. The generator comprises an air-tight casing 11 which supports a laminated stator core 12 and has bearings 13 mounting a rotor 14 for rotation therein. The stator core 12 is composed of laminations assembled to define a large number of radial cooling ducts 15 spaced axially along the stator core and also in the circumferential direction. The stator windings 16 are cooled by liquid supplied through insulating hoses 17 and recirculated for cooling in an external system not here shown. A number of partitions 18 are arranged as illustrated between the casing and the stator core, and divide the casing into compartments serving to isolate cool radially in-flowing gas coolant from heated radially out-flowing gas coolant as indicated by the flow arrows. The stator is thereby divided axially into zones such that groups of radial stator ducts 15a carrying inwardly flowing gas alternate with groups of radial stator ducts 15b carrying outwardly flowing gas. The hydrogen or other gas coolant is circulated through the casing and through heat exchangers 19 by means of low pressure fans 20 on either end of the rotor. Alternatively, low pressure stator blowers can be provided.

Rotor 14 is a gap pickup rotor with provision for cooling by scooping gas coolant from the "air" gap 21 through scoop-like inlet pickups or ducts 22 and discharging it back to the gap through outlet ducts or holes 23. The rotor inlet pickups 22 and outlet ducts 23 are arranged axially in groups to provide alternating inlet zones 24 and outlet zones 25. In each inlet zone the rotor inlets 22 are aligned axially with a group of radial stator ducts 15a carrying cool inwardly flowing gas, whereas the rotor outlets 23 in each outlet zone are aligned axially with a group of radial stator ducts 15b carrying heated outwardly flowing gas. Such zone cooling is necessary in large generators having a length of about 20 to 30 feet. Gas moves longitudinally along the rotor between each inlet duct 22 and a corresponding outlet duct 23 at either side by means of flow passages extending diagonally down to the bottom of the rotor slot and then diagonally outward again through staggered holes formed in the rotor windings.

Figure 2:
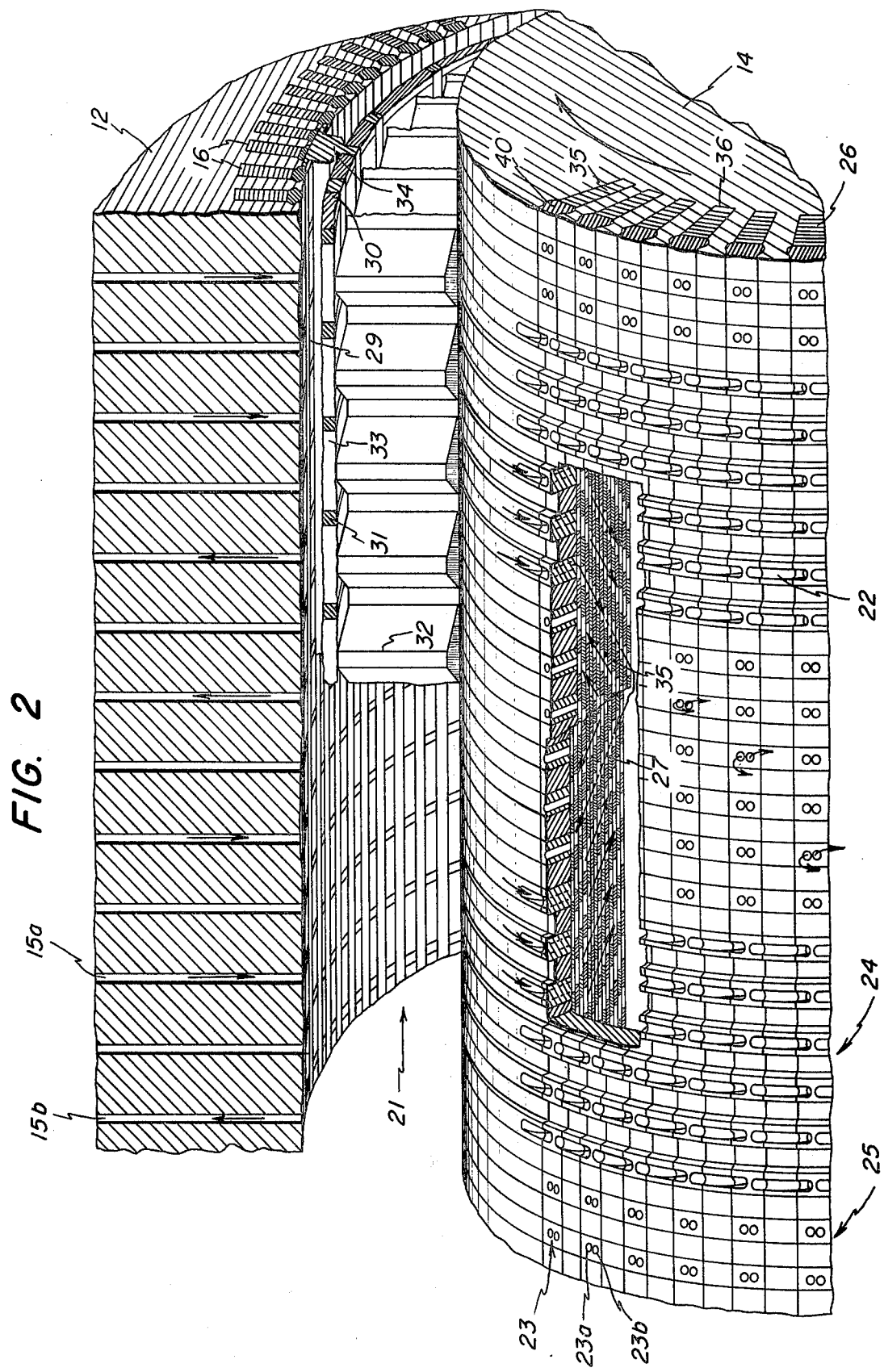
FIG. 2 is an enlarged partial perspective view, with parts broken away and in section to expose internal details, illustrating a portion of the stator, a gap provided with a typical baffling arrangement, and a portion of the length of a rotor with diagonal, passages between paired inlet ducts and outlet ducts of axially adjoining arrays of alternate inlet and outlet ducts.

Referring to FIG. 2, it is seen that the rotor windings 26 are provided by stacked axially extending conductors 35 disposed in a plurality of circumferentially spaced, axially extending, radial slots 36. A portion of one of these rotor windings within a radial slot is broken away to illustrate diagonal flow passages 27 for conducting the gas coolant in the axial direction between a pair of spaced inlet ducts 22 and an outlet duct means 23. In practice, there is associated with each rotor pickup inlet duct 22 in each wedge 40 an immediately underlying flow divider structure 38 (or creepage block) to split the intake gas coolant flow into two downwardly then upwardly proceeding diagonal passages connecting respectively to outlet duct means 23 at either side of the particular inlet zone. The scoop-shaped inlets 22 are substantially flush with the rotor surface and are contoured so as to convert the relative motion between the rotor and the coolant in the gap 21 into a pressure head for forcing the gas through the winding by a rotor pumping action. Due to the rotation of the rotor, a swirl flow is created in the annular gap between the stator and the rotor. In a large generator, the width of the gap 21 is typically four inches, permitting the completed rotor to be moved longitudinally inside of the completed stator during final assembly on the machine. In order to reduce the tendency for axial leakage of the gas coolant in such a large clearance, and in particular the mixing of the hot discharged coolant with the cool intake coolant, and to provide improved and more efficient ventilation of the generator or other dynamoelectric machine there may be provided in accordance with my aforementioned co-pending application, one or more honecomb stator inserts 30, supported by the stator core 12 and extending into the gap 21. The honeycomb stator inserts 30 are mounted on the machine after assembly of the rotor, and can be circumferentially continuous or substantially continuous while markedly reducing the effective gap clearance. Each honeycomb stator insert 30 is comprised by an arcuate or curved perforated plate 31 having attached to its inner surface a large cell honeycomb baffle structure 32. The conventional inexpensively manufactured six-sided honeycomb material is preferred, however other appropriate cross sections can be used. The size of the holes 33 in the perforated plate 31 is not critical so long as there is a flow passage for gas coolant radially through each of the honecomb cells. The perforated plate 31 and honeycomb cell structure 32 are made of a suitable non-magnetic metallic material or non-metallic material, such as aluminum, a non-magnetic steel, a suitable plastic, or fiberglass. One or more longitudinally extending support members or guide channels 34 are attached to the outer surface of the perforated plate 31 and facilitate the mounting of the honeycomb insert by sliding into correspondingly shaped grooves in the inner surface of the stator core 12. When the several honeycomb stator inserts or sectors for a given machine are all assembled, nearly complete peripheral closure of the gap 21 is achieved.

The aforementioned Willyoung patent shows an alternate to the provision of honeycomb stator inserts 30, in the form of partial radial baffles, as more fully explained in the patent.

In the instances of the embodiments illustrated for both the machine of the aforementioned Willyoung patent and the machine and modifications of FIGS. 1–5 of my aforementioned application, two ascending diagonal passages combine their ventilation flows into a single common outlet port hole. This co-mixing of flows creates a vortex, or cyclone-type exit flow structure, producing considerable pressure loss. This PRIOR ART construction is shown in FIG. 3, wherein two diagonal exit flow passages 27 ascend toward one another through the windings 26, to a creepage block 38 which is provided with a radial opening 39 in which two previously separate flows entering through the radially inner side are combined into one vortical flow leaving through the radially outer side and passing out into the gap 21 via the single outlet port 23.

In contrast, in accordance with the principles of the present invention, each two diagonal flow passages 27 which ascend toward one another pass their respective individual flows through separate openings 39a, 39b extending through the creepage block 38, and then through respective individual outlet ports 23a, 23b into gap 21. In the design shown, in order to require the least modification of the remainder of the machine, the openings 39a and 39b are angularly spaced from one another at a common axial distance along the rotor and the outlet ports 23a and 23b, respectively, directly radially overlie the openings 39a and 39b.

Each creepage block 38 extends the length of the radial slot 36 in which it is received and provides insulation between the outer metallic wedge 40 which acts as a retainer and takes the stress load of rotation of the rotor, and the copper of the windings 35. The members 40 are termed "wedges" because they include large angularly outwardly projecting beads 41 along their angularly opposite edges, which fit in corresponding grooves 42 formed in each radial slot along the length of the slot adjacent the mouth thereof.

By way of example, in a rotor which measures about forty inches in diameter, each radial slot may be about three to five inches deep and several alternating groups of inlets 22 and outlet means 23 may be provided.

Each inlet 22 connects with two diagonal passages 27 which respectively emerge (1) through an outlet 23a in a group of outlet means spaced in one axial direction from the inlet zone 24 containing the particular inlet 22 under discussion, and (2) through an outlet 23b in a group of outlet means spaced in the opposite axial direction from that same inlet zone 24. Likewise, each outlet means 23, consisting of twinned, individual outlets 23a, 23b serves two diagonal passages originating at two axially separated inlets 22 disposed in groups of inlets on axially opposite sides of the outlet zone 25, which contains the particular outlet means 23 under discussion. This arrangement holds true for all the inlets and outlets except the inlets at the two opposite ends of the rotor, each of which connects to a single diagonal passage 27.

The outer surfaces of the wedges may, if desired, be sculptured in the vicinity of the emergences of the outlet ports 23a, 23b of each outlet means. Disposition of these outlet ports in angularly spaced relation has permitted the composite cross-sectional area of the ports to be increased somewhat without placing unacceptable stress upon the wedges 40 during rotation. For instance, a single 9/16 inch diameter outlet port 23 of FIG. 3 is replaced in FIG. 4 by two one-half inch diameter outlet ports 23a and 23b in FIG. 4. In this typicl example, the cross-sectional area of each passage 27 is 0.15 square inch and the cross-sectional area of each outlet port 23a and 23b is 0.196 square inch. This sudden enlargement in area in the transition from the passages 27 to the individual outlet ports 23a, 23b provides for sudden expansion of the emerging gas, allowing some recovery of kinetic energy.

Compared with the PRIOR ART design shown in FIG. 3, the twinned outlet design of FIG. 4, with the dimensions given in the above example, shows a 0.7 kinetic head savings. The static-to-static pressure loss for a diagonal passage is about 2.6 kinetic heads based on the area of the diagonal passage, or about 1.78 kinetic heads based on outlet area. This, combined with the 1.0 kinetic head loss measured with an outlet of the FIG. 3 PRIOR ART design may be reduced to 2.08 , from 2.78 kinetic heads, indicating a twelve percent flow increase, merely by switching from the PRIOR ART design of FIG. 3, to the new design, shown in FIG. 4. This, thereby, provides an approximate 12% increase in ventilation flow.

It should now be apparent that the generator rotor outlets for increased ventilation as described hereinabove possesses each of the attributes set forth in the specification under the heading "Summary of the Invention" hereinbefore. Because the generator rotor outlets for increased ventilation of the invention can be modified to some extent without departing from the principles of the invention as they have been outlined and explained in this specification, the present invention should be understood as encompassing all such modifications as are within the spirit and scope of the following claims.

What is claimed:

1. In a dynamoelectric machine of the type having an air tight casing with a stator core, a rotor defining an air gap with the stator core, and means for recirculating and cooling the gas inside said casing, the combination comprising:
    a plurality of inlet means located along at least two axially spaced inlet zones extending circumferentially of said rotor for scooping in gas from the air gap upon rotation of said rotor,
    a plurality of outlet means located along at least one outlet zone extending circumferentially of said rotor for discharging gas into said air gap, an outlet zone being disposed between two axially-spaced inlet zones,
    passages extending within the rotor to interconnect said inlet means with said outlet means thereby conveying gas scooped in by said inlet means through interior portions of said rotor to said outlet means for discharge therefrom, each outlet means comprising two separate gas outlet ducts and being connected to two passages with each of said two passages being connected to a separate gas outlet duct.

2. The combination according to claim 1 wherein:
    the rotor has means defining a plurality of axially extending, angularly spaced radial slots, rotor windings disposed in each of said slots insulated from the walls thereof, wedge means located at the mouth of each slot connected between the flanks of the respective slot at the mouth thereof, and creepage block insulation means interposed radially between the windings and wedge means in each slot;
    the outlet ducts and ducts for the inlet means being defined in said wedge means with the passages proceeding axially and radially inward from inlet means through creepage block insulation means and then the windings toward the bottom of said slot and thereafter continuing axially and radially outwardly through said windings and creepage block insulation means, each passage being in sole communication with an individual outlet duct.

3. The combination according to claim 2 wherein the windings are in the form of stacked axially extending electrical conductors.

4. The combination according to claim 1, further comprising:
    means defining a plurality of axially spaced radial stator ducts for conducting coolant to and from the air gap; and
    baffle means extending part way from the stator toward the rotor through said gap for directing gas flow between said stator ducts and the inlet and outlet zones.

5. In a dynamoelectric machine of the type wherein the stator core and rotor thereof define an air gap within an air tight casing, means are provided for recirculating and cooling the gas in said casing and said rotor includes rotor windings disposed in spaced radial slots, means are formed in wedge means disposed at the mouth of each slot for scooping gas from said air gap, means are in flow communication with said scooping means for directing said gas as a pair of oppositely-directed separate gas flows passing inwardly through said windings in combined axial/radial directions and then outwardly through said windings in combined axial/radial directions and means in flow communication with said directing means are located in said wedge means for discharging the plurality of gas flows from said rotor into said air gap, the improvement comprising:
    said discharge means being adapted to receive two separate gas flows and discharge each separate gas flow via an outlet individual thereto.

6. The improvement of claim 5 wherein a pair of outlets are disposed angularly of each other in the same wedge means.

* * * * *